United States Patent [19]
Gibson

[11] 3,988,029
[45] Oct. 26, 1976

[54] CRYOGENIC FLUID COUPLING DEVICE
[75] Inventor: Clarence John Gibson, El Cajon, Calif.
[73] Assignee: Kaiser Aerospace and Electronics Corporation, Oakland, Calif.
[22] Filed: Aug. 28, 1974
[21] Appl. No.: 501,268

[52] U.S. Cl. ............................ 285/47; 285/DIG. 5; 285/133 R
[51] Int. Cl.² .................. F16L 11/12; F16L 55/00; F16L 59/16
[58] Field of Search................. 285/47, 52, DIG. 5, 285/133

[56]     References Cited
UNITED STATES PATENTS
3,137,143  6/1964  Jacobs et al. ..................... 285/47 X
3,248,132  4/1966  Pierce ................................. 285/133
3,316,931  5/1967  Elrod ............................. 285/133 X FOREIGN PATENTS OR APPLICATIONS
1,203,769  9/1970  United Kingdom................... 285/47

Primary Examiner—Wayne L. Shedd
Attorney, Agent, or Firm—Bruno J. Verbeck

[57]        ABSTRACT

A coupling device for cryogenic fluids which allows passage of liquid and vapor simultaneously through one coaxially arranged assembly. Principle features include low heat transfer insulation integral with the coupling and the ability to connect and disconnect it without use of tools. The coupling consists of a male and a female portion, each of which comprises three coaxially arranged metal tubes.

6 Claims, 3 Drawing Figures

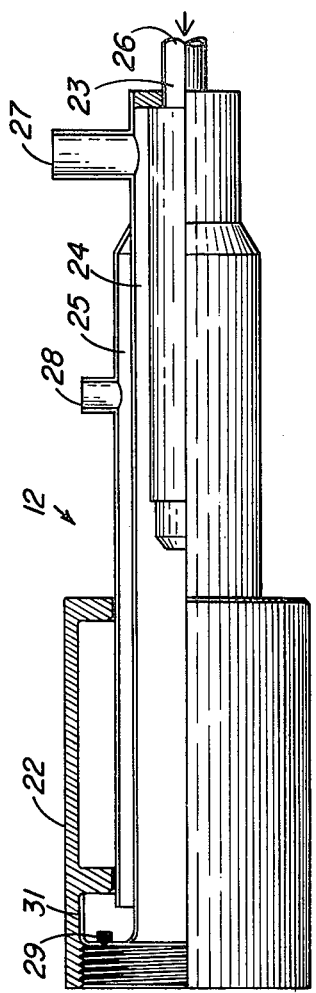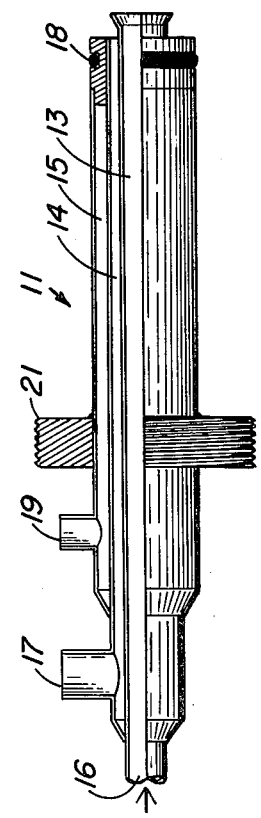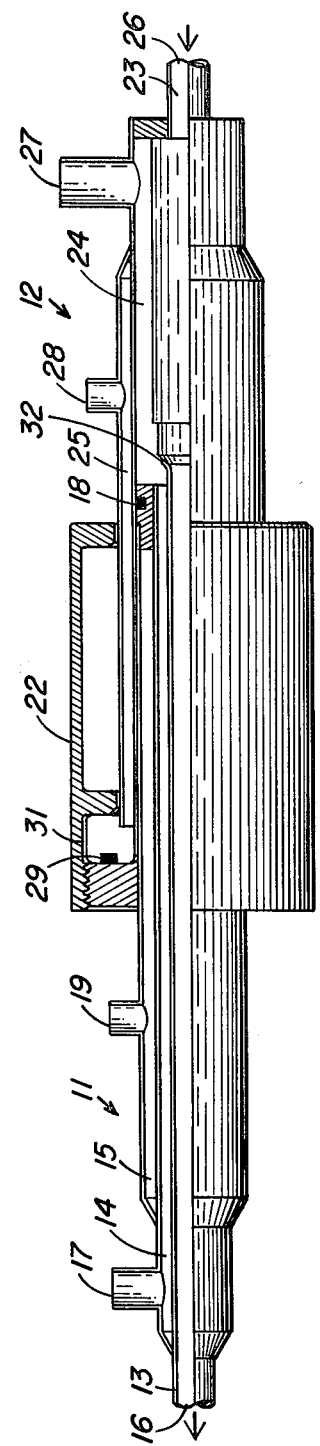

CRYOGENIC FLUID COUPLING DEVICE

BACKGROUND OF THE INVENTION

Field of the Invention

The invention relates to a cryogenic fluid coupling device. More specifically it is concerned with a cryogenic fluid coupling which permits passage of liquid and vapor simultaneously through one coaxially arranged assembly.

In transferring cryogenic fluids, as from one container to another, energy has been normally imparted to the moving fluid. Some of this energy takes the form of heat and causes part of the cryogenic liquid in the receiving container to vaporize. The vapor is either returned to storage or vented through a venting system — in either event the vapor is usually channeled off in one way or another.

The present invention makes it possible to handle the vapor as above described and channel it to a receiving container by means of a single connection means. This single connection, or coupling, can be safely handled and broken with unprotected hands and without a need for special tools or other equipment. Furthermore, since the coupling is vacuum insulated it is a very low heat input component of the transfer system between vessels.

SUMMARY OF THE INVENTION

The cryogenic fluid coupling device of this invention comprises a male part and a female part, both containing three coaxially arranged metal tubes. The inner tube contains the liquid cryogen to be transferred, the middle tube contains the vapor returning from the vessel being filled and the outer tube is a vacuum jacket.

Positioned on the female portion of the coupling is a liquid inlet port and a vapor outlet port, and on the male portion a liquid outlet port and a vapor inlet port. A vacuum pump-down port is positioned on each of the portions.

On the male portion of the coupling an elastomeric vapor wiper seal is so arranged as to essentially prevent passage of liquid cryogen past that point. An "O" ring which functions as a vapor seal is located in the relatively warm outer area of the end of the female portion of the coupling to prevent vapor passage. When the male and female portions comprising the coupling are joined for transfer of the cryogenic fluid, none of that fluid escapes from the joint to the ambient atmosphere.

Means is provided for quickly connecting and disconnection of the coupling.

BRIEF DESCRIPTION OF THE DRAWINGS

FIG. 1 is a view, partly in section, of the cryogenic fluid coupling device, comprising a male disconnect portion and a female disconnect portion in mated assembly form;

FIG. 2 is a view, partly in section, of the male disconnect portion of the assembly of FIG. 1; and FIG. 3 is a view, partly in section, of the female disconnect portion of the assembly of FIG. 1.

DESCRIPTION OF THE PREFERRED EMBODIMENT

In the drawings, the cryogenic fluid coupling device shown in FIG. 1 comprises a male disconnect portion 11 and a female disconnect portion 12 in mated relationship. The male portion, as shown in FIG. 2, comprises three coaxially arranged metal tubes. The inner tube 13 contains the liquid cryogen to be transferred, the middle tube 14 contains the vapor returning from the vessel being filled, and the outer tube is a vacuum jacket for insulation purposes. A liquid outlet port 16 and a vapor inlet port 17 are also located as shown.

A vapor wiper seal 18 of any suitable elastomeric material is arranged on the end of the male portion of the device as shown so as to prevent passage of liquid cryogen past that point. A vacuum pump-down port 19 is located as shown. A threaded male flange 21 joins with a nut 22 on the female portion of the device to enable rapid connection and disconnection of the coupling.

The female portion, shown in FIG. 3 also comprises three coaxially arranged metal tubes, of which the inner tube 23 contains the liquid cryogen being transferred, the middle tube 24 contains the vapor returning from the vessel being filled, and the outer tube 25 is a vacuum jacket. A liquid inlet port 26, a vapor outlet port 27, and a vacuum pump-down port 28 are located as shown. A vapor "O" ring seal 29 is located in the relatively warm outer area of the end of the female portion of the coupling to prevent passage of vapor.

When the nut 22 of the female flange 31 is joined with the threaded male flange 21, a metal-to-metal liquid seal is formed at 32 as shown.

All of the fluid containing tubing components of the male and female portions of the coupling are preferably constructed of such suitable low temperature metal alloys as stainless steel, nickel alloys or aluminum alloys. The nut 22 may be of any machineable material, the vapor wiper seal 18 is formed of a material, such as polytetrafluorethylene, which is compatible with the cryogenic fluid being transferred, and the vapor "O" ring seal 29 may be, for example, of synthetic rubber or plastic.

As mentioned hereinbefore, when cryogenic fluids are transferred from one vessel to another, energy is normally imparted to such fluid, some of which (energy) takes the form of heat and causes some of the liquid in the receiving vessel to become a vapor in the ullage space. That vapor must be returned either to storage or vented via a safe venting system.

My invention makes it possible to handle the vapor return with a single point of connection to the receiving vessel, and also makes it safe and convenient to handle this single coupling with unprotected hands while making and breaking the connection. A further advantage is that since my device is double concentric vacuum insulated it is a very low heat input component of the transfer system between vessels.

As shown in the drawings, the longated bayonet action of my invention provides for the sequential connection and disconnection of the metal-to-metal seal of the inner tube at 32 and the vapor wiper seal of the middle tube at 18 when the male and female portions are correspondingly connected and disconnected. The sequential disconnection of the inner and middle tube allows the momentary evaporation of the cryogenic liquid, which is left in the inner tube after the transfer valves have been shut off, to dissipate and escape through the middle tubing or vapor outlet and not onto the operator.

It will be apparent that modifications and variations may be made in the herein disclosed embodiment without departing from the scope of the novel concepts of the present invention. It is accordingly my intention that the scope of the invention be limited solely by that of the hereinafter appended claims.

I claim:

1. A device for passage of cryogenic liquid therethrough to a vessel, comprising a coupling formed of a female portion and a male portion, said female portion comprising an inner tube having a liquid inlet port for transferring liquid cryogen, a middle tube having a vapor outlet port for transferring vapor, and an outer vacuum jacket, said male portion comprising an inner tube having a liquid outlet port for transferring liquid cryogen, a middle tube having a vapor inlet port for transferring vapor, and an outer vacuum jacket, releasable means joining said male and female portions establishing a vapor seal and a liquid seal between the corresponding middle and inner tubes of said male and female portions, said means, upon release, releasing the liquid seal of said inner tube prior to releasing the vapor seal of said middle tube whereby vapor derived from the release of the liquid seal of the inner tube is collected in the middle tube, and double concentric vacuum jackets which extend over the length of the junction of said male and female portions.

2. The device of claim 1 wherein the said male portion has a threaded flange.

3. The device of claim 1 wherein the said female portion has a nut for threadably joining a threaded flange on said male portion.

4. The device of claim 1 wherein threadably joining the male and female portions brings together the male and female portions so as to form a metal-to-metal liquid seal at the juncture of the inner tubes of each said portion.

5. The device of claim 1 wherein said tubes are formed of a metal alloy suitable for transporting liquid cryogens therethrough.

6. The device of claim 1 wherein threadably joining the male and female portions brings together the male and female portions so as to form a vapor seal at the juncture of the middle tubes of each said portion.

* * * * *